United States Patent
Sun et al.

(10) Patent No.: US 9,800,368 B2
(45) Date of Patent: Oct. 24, 2017

(54) METHOD, ENB, TERMINAL AND SYSTEM FOR ADAPTIVELY ADJUSTING MODULATION CODING SCHEME AND REFERENCE SIGNAL PATTERN

(71) Applicant: Samsung Electronics Co., Ltd, Gyeonggi-do (KR)

(72) Inventors: Pengfei Sun, Beijing (CN); Bin Yu, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 110 days.

(21) Appl. No.: 14/678,860

(22) Filed: Apr. 3, 2015

(65) Prior Publication Data
US 2015/0288483 A1 Oct. 8, 2015

(30) Foreign Application Priority Data
Apr. 4, 2014 (CN) .......................... 2014 1 0136796

(51) Int. Cl.
*H04W 4/00* (2009.01)
*H04L 1/00* (2006.01)
*H04L 27/00* (2006.01)
*H04L 5/00* (2006.01)

(52) U.S. Cl.
CPC .......... *H04L 1/0003* (2013.01); *H04L 1/0009* (2013.01); *H04L 1/0017* (2013.01); *H04L 1/0026* (2013.01); *H04L 1/0033* (2013.01); *H04L 5/0048* (2013.01); *H04L 27/0012* (2013.01)

(58) Field of Classification Search
CPC ... H04L 1/0003; H04L 1/0009; H04L 1/0017; H04L 1/0026; H04L 1/0033; H04L 5/0048; H04L 27/0012
See application file for complete search history.

(56) References Cited

U.S. PATENT DOCUMENTS

| | | | | |
|---|---|---|---|---|
| 2010/0195748 A1* | 8/2010 | Nam | .................... | H04J 11/0069 375/260 |
| 2010/0322184 A1* | 12/2010 | Xiao | ........................ | G01S 1/20 370/330 |
| 2011/0268072 A1* | 11/2011 | Lee | ........................ | H04B 7/068 370/329 |
| 2012/0008574 A1* | 1/2012 | Xiao | ..................... | H04L 1/0007 370/329 |

(Continued)

*Primary Examiner* — Abdelnabi O Musa

(57) ABSTRACT

A method for adaptively adjusting a modulation coding scheme and a reference signal pattern. The method includes: determining a Modulation Coding and Reference Signal Pattern Scheme (MCPS) index according to channel status information, the MCPS being used for indicating a reference signal pattern, a modulation scheme and/or a modulation order and TBS; performing communication according to the reference signal pattern, modulation scheme and/or modulation order and TBS corresponding to the MCPS index. Another example of the present disclosure further provides a corresponding eNB, terminal and system. With examples of the present disclosure, the reference signal pattern and modulation coding scheme may be adaptively and jointly adjusted according to requirements to obtain the optimal transmission efficiency.

18 Claims, 6 Drawing Sheets

(56) References Cited

U.S. PATENT DOCUMENTS

| | | | |
|---|---|---|---|
| 2012/0207054 A1* | 8/2012 | Okubo | H04L 1/0003 370/252 |
| 2014/0044054 A1* | 2/2014 | Kim | H04W 72/0453 370/329 |
| 2014/0044104 A1* | 2/2014 | Kim | H04L 5/0048 370/336 |
| 2014/0254509 A1* | 9/2014 | Chen | H04L 5/0058 370/329 |
| 2015/0049703 A1* | 2/2015 | Nobukiyo | H04L 5/0057 370/329 |
| 2015/0085767 A1* | 3/2015 | Einhaus | H04L 1/0001 370/329 |
| 2016/0226623 A1* | 8/2016 | Froberg Olsson | H04L 1/0023 |

* cited by examiner

METHOD, ENB, TERMINAL AND SYSTEM FOR ADAPTIVELY ADJUSTING MODULATION CODING SCHEME AND REFERENCE SIGNAL PATTERN

CROSS-REFERENCE TO RELATED APPLICATION AND CLAIM OF PRIORITY

The present application is related to and claims the benefit under 35 U.S.C. §119(a) of a Chinese Patent Application filed on Apr. 4, 2014, in the Chinese Intellectual Property Office and assigned Serial No. 201410136796.3, the entire disclosure of which is hereby incorporated by reference.

TECHNICAL FIELD

The preset application relates to a wireless communication technology field, and more particularly, to a method, evolved Node B (eNB) and terminal for adaptively adjusting a modulation coding scheme and a reference signal pattern.

BACKGROUND

In a wireless communication system, a transmitted signal arrives at a receiving end via a complex and varying wireless channel. In order to implement reliable and effective data transmission, a wireless communication system generally uses a channel adaptive transmission method. The principle of the hannel adaptive method, such as a widely-used channel adaptive modulation and coding transmission method is changing a transmission method according to a condition of the channel.

An adaptive Modulation Coding Scheme (MCS) is selected according to a Signal to Interference and Noise Ratio of a channel. The MCS with the largest transmission rate, i.e. the highest order modulation scheme and largest channel coding rate, may be selected according to prior data under the condition of ensuring a Block Error Rate (BLER). In a Long Term Evolution (LTE) system corresponding to an Evolved Universal Terrestrial Radio Access (E-UTRA) protocol made by a 3rd Generation Partnership Project (3GPP), a selected BLER threshold is not larger than 10%. According to the prior data, such as the data obtained by the simulation or test, various different MCSs which respectively correspond to different transmission efficiencies (the transmission efficiency=the coding rate×the modulation order) are quantified in the LTE protocol for implementing effective Adaptive Modulation and Coding (AMC).

SUMMARY

To address the above-discussed deficiencies, it is a primary object to provide a method for adaptively adjusting a modulation coding scheme and a reference signal pattern, which adaptively and jointly adjusts the reference signal pattern and the modulation coding scheme according to requirements to obtain the optimal transmission efficiency.

An example of the present disclosure provides a method for adaptively adjusting a modulation coding scheme and a reference signal pattern, including determining a Modulation Coding and Reference Signal Pattern Scheme (MCPS) index according to channel status information, the MCPS being used for indicating a reference signal pattern, a modulation scheme and/or a modulation order and Transport Block Size (TBS); and performing communication according to the reference signal pattern, modulation scheme and/or modulation order and TBS corresponding to the MCPS index.

The MCPS index is used for searching a MCPS look-up table. The MCPS look-up table includes: a corresponding relationship among the reference signal pattern, modulation scheme and/or modulation order and TBS.

The MCPS look-up table configures the modulation scheme and/or modulation order and the TBS according to a channel estimation performance corresponding to a quantified channel condition and reference signal pattern to satisfy the minimum requirement limitation of Block Error Rate (BLER). The channel condition includes but is not limited to a Signal to Interference and Noise Ratio (SINR) level.

The modulation order and TBS is configured according to a principle of the maximum transmission efficiency. The transmission efficiency is a bit number of valid information transmitted on the minimum resource unit. The transmission efficiency E=channel coding rate $R\_c$×the modulation order $Q\_m$.

The reference signal pattern in the MCPS look-up table includes: different reference signal density and/or different reference signal sequences and/or different reference signal power. The channel status information includes one or multiple of: mobile speed information, the SINR, delay spread information of the channel. The channel status information is obtained via an explicit feedback method or an implicit obtaining method. The explicit feedback method includes: receiving a direct quantization value of various kinds of channel status information or a quantization value of combined and compressed channel status information and obtaining the channel status information according to the quantization value and a corresponding relationship between a quantization value and the channel status information.

The implicit obtaining method includes: obtaining the corresponding channel status information by measuring a Sounding Reference Signal and/or positioning information. The method further includes: setting the MCPS index in a scheduling grant signaling and dynamically adjusting the MCPS index via the scheduling grant signaling according to a channel condition.

An example of the present disclosure provides an eNB, including: an index determination module and a communication module. The index determination module is to determine a Modulation Coding and Reference Signal Pattern Scheme (MCPS) index according to channel status information, the MCPS index is used for indicating a reference signal pattern, a modulation scheme and/or a modulation order and TBS. The communication module is to perform communication according to the reference signal pattern, modulation scheme and/or modulation order and TBS corresponding to the MCPS index.

Another example of the present disclosure provides a method for adaptively adjusting a modulation coding scheme and a reference signal pattern, including: obtaining a Modulation Coding and Reference Signal Pattern Scheme (MCPS) index, the MCPS index being used for indicating a reference signal pattern, a modulation scheme and/or a modulation order and TBS; and performing communication according to the reference signal pattern, modulation scheme and/or modulation order and TBS indicated by the MCPS index. The method further includes: searching a MCPS look-up table using the MCPS index; and obtaining the reference signal pattern, modulation scheme and/or modulation order and TBS; wherein the MCPS look-up table includes: a corresponding relationship among the reference signal pattern, modulation scheme and/or modulation order and TBS. The MCPS look-up table configures the modulation scheme and/or modulation order and the TBS according to a channel estimation performance corresponding to a quantified channel condition and reference signal pattern to satisfy the minimum requirement limitation of Block Error Rate (BLER). The channel condition includes but is not limited to a Signal to Interference and Noise Ratio (SINR) level. The modulation order and TBS is configured according to a principle of the maximum transmission efficiency. The transmission efficiency is a bit number of valid information transmitted on the minimum resource unit. The transmission efficiency E=channel coding rate R_c×the modulation order Q_m. The reference signal pattern in the MCPS look-up table includes: different reference signal density and/or different reference signal sequences and/or different reference signal power. The method further includes: detecting channel status information; and reporting the channel status information; wherein the channel status information includes one or multiple of: mobile speed information, the SINR, delay spread information of the channel.

A reporting method includes: directly quantifying various kinds of channel status information or quantifying combined and compressed channel status information; obtaining a quantization value; and reporting the quantization value. The method for obtaining the MCPS index includes: obtaining the MCPS index from a scheduling grant signaling; and the scheduling grant signaling dynamically adjusts the MCPS index according to a channel condition.

Another example of the present disclosure provides a terminal, including: an index obtaining module and a communication module. The index obtaining module is to obtain a Modulation Coding and Reference Signal Pattern Scheme (MCPS) index. The MCPS index is used for indicating a reference signal pattern, a modulation scheme and/or a modulation order and TBS. The communication module is to perform communication according to the reference signal pattern, modulation scheme and/or modulation order and TBS indicated by the MCPS index.

Another example of the present disclosure provides a system, including: an eNB and a terminal. The eNB is to determine a Modulation Coding and Reference Signal Pattern Scheme (MCPS) index according to channel status information and send the MCPS index to the terminal.

The terminal is to determine a reference signal pattern, a modulation scheme and/or a modulation order and TBS according to an indication of the MCPS index. The eNB and the terminal perform communication according to the reference signal pattern, modulation scheme and/or modulation order and TBS indicated by the MCPS index.

It may be seen from the above technical scheme that with the method for adaptively adjusting a modulation coding scheme and a reference signal pattern, the MCPS index may be determined first according to the channel status information, the reference signal pattern, modulation scheme and/or modulation order and TBS may be determined according to the MCPS index and the communication may be performed according to the reference signal pattern, modulation scheme and/or modulation order and TBS. The reference signal pattern and modulation coding scheme may be adaptively and jointly adjusted according to requirements to obtain the optimal transmission efficiency.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
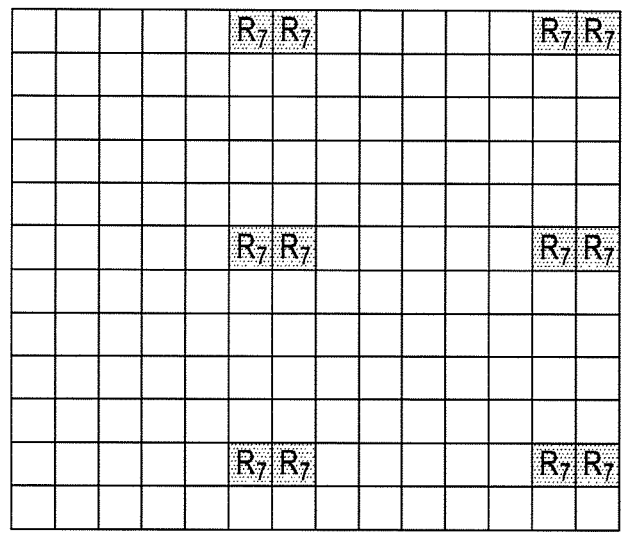
FIG. 1 illustrates a downlink demodulation reference signal pattern of the LTE according to embodiments of this disclosure.
Figure 2:
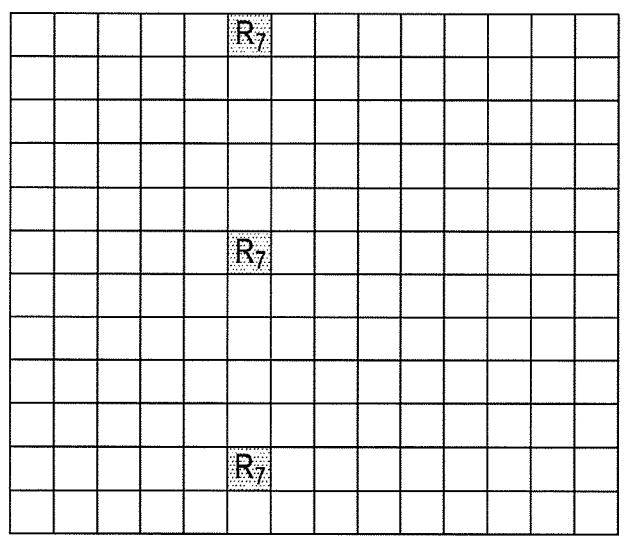
FIG. 2 illustrates a low-density demodulation reference signal pattern according to this disclosure.

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

In LTE DL (Downlink) transmission, a terminal provides a recommended MCS value via DL Channel Quality Information (CQI). The MCS value is determined by the terminal according to sensitivity of the terminal and a measured channel SINR. The MCS which may be fed back by the terminal is shown in Table 1. In actual scheduling of the eNB, the CQI reported by the terminal may be used as a reference for selecting the MCS, the Transport Block Size (TBS) is determined according to an actual algorithm, scheduled physical resources and a selected MCS index. Table 2 is a mapping table of a MCS index, modulation scheme and the TBS in the LTE. The terminal finds bit number of information in a transport block from a look-up table according to scheduled resources and $I_{MCS}$ (MCS index). With the given physical resources, different TBS and MCS result in different channel coding efficiency.

TABLE 1 a modulation coding table fed back by an LTE terminal

| CQI index | modulation | code rate × 1024 | efficiency |
|---|---|---|---|
| 0 | | out of range | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

TABLE 2

LTE modulation and TBS mapping table

| MCS Index $I_{MCS}$ | Modulation Order $Q_m$ | TBS Index $I_{TBS}$ |
|---|---|---|
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 2 | 6 |
| 7 | 2 | 7 |
| 8 | 2 | 8 |
| 9 | 2 | 9 |
| 10 | 4 | 9 |
| 11 | 4 | 10 |
| 12 | 4 | 11 |
| 13 | 4 | 12 |
| 14 | 4 | 13 |
| 15 | 4 | 14 |
| 16 | 4 | 15 |
| 17 | 6 | 15 |
| 18 | 6 | 16 |
| 19 | 6 | 17 |
| 20 | 6 | 18 |
| 21 | 6 | 19 |
| 22 | 6 | 20 |
| 23 | 6 | 21 |
| 24 | 6 | 22 |
| 25 | 6 | 23 |
| 26 | 6 | 24 |
| 27 | 6 | 25 |
| 28 | 6 | 26 |
| 29 | 2 | reserved |
| 30 | 4 | |
| 31 | 6 | |

In communication systems, for simplicity, an extreme transmission scenario is not optimized and parameter design of a reference signal is calculated in advance according to a statistical property of a channel and a target typical scenario designed for the system. Therefore, in these systems, the design of the reference signal pattern is relatively stable. The AMC may be simplified as adjusting the transmission efficiency, i.e. selecting the MCS, according to the SINR and a receiving sensitivity. Actually, the design of the reference signal is an important factor affecting the BLER and taken into consideration in the AMC. It may be predicted that the adaptive transmission mode may largely limit improvement of a system performance since the adaptive transmission scheme needs to support more transmission scenarios better in the future mobile communication system.

An ultra-high-speed scenario: a wireless communication service is being extended to include the ultra-high-speed moving scenario, such as a high speed railway and civil aviation passenger plane as the demands increase. Ultra-high-speed mobile communication means that a time-varying property of the channel becomes more severe. In a MCS and TBS design based on a static reference signal, the performance of a receiver may be reduced since the channel cannot be accurately estimated. Therefore, higher transmission efficiency cannot be used. That is, it may be forced that the lowest order modulation scheme and lowest channel coding rate is selected. Therefore, the transmission efficiency is limited and user experience is affected.

Ultra-high-order modulation: in order to further increase spectrum efficiency, a higher order modulation scheme, such as 256QAM and 1024QAM may be used in the communication system, such as the design of a small cell in the LTE. These high order modulation schemes are sensitive to a channel estimation error. However, the reference signal design cannot provide enough flexibility.

Ultra-high-frequency communication: when ultra-high frequency, such as millimeter wave communication is used, the statistical property of the channel is greatly different from that of the low frequency channel. Line of Sight (LOS) statistics of the high frequency channel is different from Non-Line of Sight (NLOS) statistics of the high frequency channel. Delay spread of LOS transmission is greatly less than that of the NLOS transmission, which means that the AMC designed based on one kind of reference signal cannot be the optimal AMC in two different scenarios.

High reliability communication: as the wireless communication is introduced into an industrial control field, the future wireless communication requires that the terminal may perform reliable communication in any scenario, which means that the receiver has a relatively good receiving performance in a low SINR scenario. That is, the communication system may need to enhance density of the reference signal to ensure the channel estimation performance in the low SINR.

It may be seen from the above analysis that the AMC based on the relatively stable reference signal pattern cannot be used in changeable channel scenarios in the future mobile communication. Therefore, the AMC, in which the design of the adaptive reference signal pattern is taken into consideration, is a method which balances the transmission efficiency and transmission reliability. The system may enhance the transmission efficiency by detecting a channel status and adjusting a reference signal pattern in a scenario with good channel condition, such as the LOS. Otherwise, in a scenario with a poor channel, such as low SINR or high Doppler shift, the channel estimation performance may be enhanced with high-density reference signal. The MCS is optimized with a given BLER. If the design of the MCS is optimized according to the channel estimation performance corresponding to the reference signal pattern and impact of the SINR on the BLER, the transmission efficiency of the future communication system may be greatly enhanced.

As for high efficiency of the adaptive reference signal pattern, relevant design may be found from published references. Such as a patent application file with a publication number of CN101341709A discloses a method for selecting a reference signal pattern according to the channel delay spread and a frequency. However, in the communication system, since the reference signal pattern cannot be adaptively adjusted, the effect of the AMC is affected. For instance, the change of the density of the reference signal affects the channel estimation and further affect the BLER. On the other hand, the density of the reference signal affects number of physical resources which may be used by the data channel and affects effective coding bit rate of the data channel. Therefore, the existing MCS, which is selected based on the SINR, cannot optimally match the current channel condition.

For instance, FIG. 1 shows a DL demodulation reference signal pattern of the LTE system. The system uses the MCS with $I_{MCS}=7$ and schedules a resource block for data transmission according to the measured SINR. However, when the time-varying property (such as, correlation time is reduced) of the channel changes, the channel estimation performance corresponding to the reference signal pattern in FIG. 1 is reduced. The MCS using the $I_{MCS}=7$ cannot achieve the demand of 10% BLER, resulting in increase of re-transmission probability. On the other hand, when the channel condition is improved, the system may use a demodulation reference signal pattern with a lower density (shown in FIG. 2) and keep the demand of 10% BLER. Nine extra symbols may be used for increasing the TBS. However, if the current TBS scheme is still used, the effective channel coding rate of the transmission may be reduced from 0.3 to 0.28 and the effective transmission rate is accordingly reduced. It may be seen that if the impact of different reference signal patterns on the AMC is not well processed, the system cannot obtain the optimal transmission efficiency.

Unless otherwise specified, the reference signal pattern processed by the present application is the demodulation reference signal pattern.

In order to address changeable channel environment in a future wireless communication scenario, an example of the present disclosure may provide a technical scheme for adaptively adjusting a reference signal pattern and a modulation coding scheme.

Figure 3:
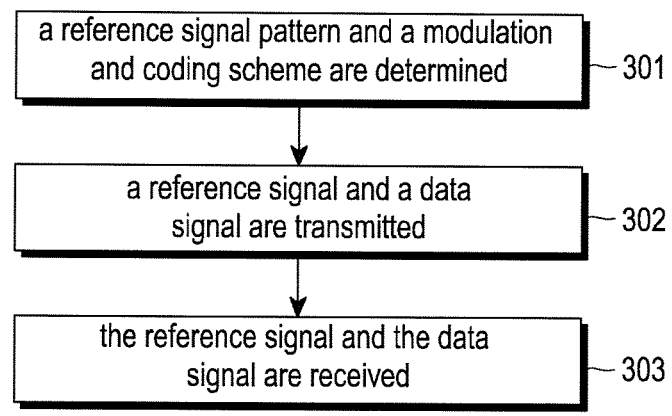
FIG. 3 illustrates a process for adaptively adjusting a modulation coding scheme and a reference signal pattern in accordance with an example of the present disclosure.

FIG. 3 illustrates a flow chart illustrating a method for adaptively adjusting a modulation coding scheme and a reference signal pattern in accordance with an example of the present disclosure. The method may include following blocks.

In block 301, a reference signal pattern and a modulation coding scheme may be determined.

In DL transmission, a mobile terminal may detect a channel environment of DL transmission, such as delay spread of the channel, whether the channel is LOS transmission or NLOS transmission, SINR and Doppler shift, according to a received reference signal, such as a Common Reference Signal (CRS), a Channel Status Information Reference Signal (CSI-RS) in a LTE system. A receiving end may feed all information back to a sending end via an explicit method based on detected channel information. For instance, the receiving end may perform binary quantization for all the channel information and send all the binary channel information to the eNB. Different bits may be selected according to range of values of each piece of channel information and each piece of channel information may be quantified. For instance, four bits may indicate the SINR and one bit may indicate Doppler shift or LOS information. In order to reduce quantity of to-be-fed-back information, all channel information may be quantified after being combined and compressed. The eNB may search for the optimal reference signal pattern and modulation coding scheme in a Modulation Coding and Reference Signal Pattern Scheme (MCPS) look-up table according to received feedback information. Selection criteria may be that the largest rate in the case that a BLER (such as 10%) may be satisfied may be selected. The eNB may send an index of the selected MCPS and grant signaling to the mobile terminal. The mobile terminal may obtain the reference signal pattern and further obtain the MCS and scheduled resources used in the DL transmission according to the grant signaling.

In Uplink (UL) transmission, the eNB may determine the reference signal pattern and the MCS via an implicit method. With this method, the mobile terminal may send a Sounding Reference Signal (SRS) according to an instruction of the eNB. The SRS may be a reference signal transmitted on reserved resources, such as the SRS in the LTE system. The eNB may estimate relevant information of the channel, such as delay spread, SINR, Doppler shift, LOS or NLOS via local calculation. At the same time, the eNB may obtain extra information via other methods, such as a mobile speed of the terminal via Global Positioning System (GPS) information of the terminal or location information of the terminal predicted with the local database. The eNB may search for the optimal reference single pattern and MCS in a MCPS table. The selection criteria may be that the highest transmission efficiency in the case that a BLER (such as 10%) may be satisfied may be selected. The transmission efficiency may be defined as bit number of valid information transmitted on the minimum resource unit.

That is, the transmission efficiency E=a channel coding rate R_c×a modulation order Q_m.

The eNB send the selected MCPS index and the grant signaling to the mobile terminal. The mobile terminal may obtain the reference signal pattern and further obtain the MCS and scheduled resources used in the UL transmission according to the grant signaling.

In block 302, a reference signal and a data signal may be transmitted.

The eNB or the terminal may send the reference signal according to the reference signal pattern according to the selected MCPS index, modulate and encode the data according to the MCS indicated by the selected MCPS index and send out the data.

In block 303, the reference signal and the data signal may be received.

In the DL transmission, the terminal may obtain selected MCPS index and scheduled resources according to the grant signaling, such as according to the PDCCH control signaling in the LTE. The terminal may obtain the MCS and the reference signal pattern via searching the local MCPS look-up table. The terminal may receive the reference signal according to the reference signal pattern and demodulate the data according to the MCS.

In the UL transmission, the eNB may receive the reference signal according to the reference single pattern indicated in advance and demodulate the data according to the indicated MCS.

In order to conveniently understand the present disclosure, an example for adaptively adjusting the reference signal pattern and MCS in accordance with specific applications may be given hereinafter.

EXAMPLE ONE

This example may provide a combined MCPS look-up table.

The design principle of the MCPS look-up table may be obtaining a value range of the SINR, with which the terminal may work, via statistical geographic information analysis. In the value range of the SINR, various candidate reference signal patterns may be designed according to different channel scenarios. The value range of the SINR may be divided into limited intervals. In each interval, a valid modulation scheme with the largest transmission rate and/or the highest modulation order and the highest channel coding rate may be selected under certain criteria. The criteria may include but not be limited to the maximum BLER (such as 10%) and/or the minimum Quality of Service (QoS) or Quality of Experience (QoE). In a process for selecting the modulation scheme and/or the modulation order and the channel coding rate, factors such as, a SINR value, channel estimation accuracy of the reference signal of the SINR value (including density, power, sequence and power ratio, etc. of the reference signal), a reference signal resource consumption and receiver sensitivity should be taken into consideration. These factors may be taken as input, an experiential modulation scheme and/or modulation order and value of channel coding rate may be obtained via the simulation or test. That is, in actual running process of the system, in a case that criteria (such as not larger than 10% BLER) is met, maximum valid data may be transmitted using the value of any item in the table when the channel estimation is performed using the corresponding reference signal pattern.

The design principle of the above reference signal pattern may be obtaining channel parameters of the terminal via channel statistics analysis. The channel parameters may include but not be limited to LOS information, delay spread information, frequency spread information, angle spread information and interference information. The parameters of the scenario may be divided into limited intervals and the optimal reference signal pattern may be designed for each interval. An example of the MCPS table may be given hereinafter with specific parameters.

TABLE 3 combined MCPS look-up table

| $I_{MCPS}$ (MCPS Index) | Modulation scheme | Reference signal pattern | Transport block index |
|---|---|---|---|
| 0 | 2 | P1 | 0 |
| 1 | 2 | P2 | 1 |
| 2 | 2 | P1 | 2 |
| 3 | 2 | P2 | 3 |
| 4 | 2 | P1 | 4 |
| 5 | 2 | P2 | 5 |
| 6 | 2 | P1 | 6 |
| 7 | 2 | P2 | 7 |
| 8 | 2 | P1 | 8 |
| 9 | 2 | P2 | 9 |
| 10 | 2 | P1 | 10 |
| 11 | 2 | P2 | 11 |
| 12 | 2 | P1 | 12 |
| 13 | 2 | P2 | 13 |
| 14 | 2 | P1 | 14 |
| 15 | 2 | P2 | 15 |
| 16 | 2 | P1 | 16 |
| 17 | 2 | P2 | 17 |
| 18 | 2 | P1 | 18 |
| 19 | 2 | P2 | 19 |
| 20 | 4 | P1 | 20 |
| 21 | 4 | P2 | 21 |
| 22 | 4 | P1 | 22 |
| 23 | 4 | P2 | 23 |
| 24 | 4 | P1 | 24 |
| 25 | 4 | P2 | 25 |
| 26 | 4 | P1 | 26 |
| 27 | 4 | P2 | 27 |
| 28 | 4 | P1 | 28 |
| 29 | 4 | P2 | 29 |
| 30 | 4 | P1 | 30 |
| 31 | 4 | P2 | 31 |
| 32 | 4 | P1 | 32 |
| 33 | 4 | P2 | 33 |
| 34 | 6 | P1 | 34 |
| 35 | 6 | P2 | 35 |
| ... | ... | ... | ... |
| 56 | 6 | P1 | 56 |
| 57 | 6 | P2 | 57 |
| 58 | 8 | P1 | 58 |
| 59 | 8 | P2 | 59 |
| ... | ... | ... | ... |
| 68 | 8 | P1 | 68 |
| 69 | 8 | P2 | 69 |

As shown in Table 3, in a column of the reference signal pattern, two different patterns, i.e. P1 and P2 are included. P1 and P2 may be two kinds of reference single patterns shown in FIG. 1 and FIG. 2 and may be other different reference signal patterns. In a column of the modulation scheme, corresponding modulation schemes and modulation orders of the modulation schemes are included. If the modulation schemes pre-defined by the system are the same kind of modulation schemes, such as Quadrature Phase Shift Keying (QPSK), 16 Quadrature Amplitude Modulation (QAM) and 256QAM, in the MCPS look-up table, the modulation scheme may be denoted with the modulation order. The value of the modulation order may represent bit number of information carried by each transmission symbol. For instance, if the modulation scheme pre-defined by the system includes different kinds of modulation methods, such as {QPSK, 16QAM, 4-Frequency Shift Keying (FSK), 8-FSK, 16-FSK, 4-ary FQAM, 8-ary FQAM[2]}, the type of the modulation may need to be directly indicated. The transport block index in the table may represent different TBS. It may be seen from the table that each kind of modulation scheme may correspond to two kinds of reference signal patterns, such as index 0 and 1 may respectively indicate the same QPSK and different reference signal patterns. At the same time, transport block indexes $I_{TBS}$ corresponding to different reference signal patterns may be different. The TBS may decide valid channel coding rate used by the data transmission. Here, the TBS may be designed according to the reference signal pattern and the modulation scheme. For instance, a preferred mode may be that when it is assumed that P1 and P2 may obtain the same channel estimation accuracy, the TBS corresponding to P2 may indicate transmitting more information bits (table 4) than that indicated by the TBS corresponding to P1. At the same time, the two kinds of MCPSs may obtain the same channel coding efficiency. Therefore, when the system finds that the channel is good, the same channel coding efficiency may be obtained with the two kinds of MCPSs. Therefore, when the system finds that the channel is good, the MCPS index corresponding to the P2 may be selected to obtain larger transmission rate. As for FSK Quadrature Amplitude Modulation (FQAM), relevant description: Sungnam Hong, Min Sagong, Chiwoo Lim, Kyungwhoon Cheun and Sunghye Cho, "FQAM: A Modulation Scheme for Beyond 4G Cellular Wireless Communication System", Globecom may be found from a reference.

TABLE 4

Transport block index look-up table

| Transport block index ($I_{TBS}$) | Resource block ($N_{PRB}$) | | | | |
|---|---|---|---|---|---|
| | 1 | 2 | 3 | 4 | ... |
| 0 | 16 | 32 | 56 | 88 | ... |
| 1 | 18 | 36 | 64 | 100 | ... |
| 2 | 24 | 56 | 88 | 144 | ... |
| 3 | 26 | 64 | 100 | 164 | ... |
| ... | ... | ... | ... | ... | ... |

Since two kinds of different reference single patterns are introduced, in order to indicate that there may be MCPSs corresponding to different SINRs, new MCPS look-up table (Table 3) may include items, the number of which is several times of those in the MCS look-up table (Table 2) of the other system. Therefore, the bit number of information for indicating the MCPS index is larger than that in the other system. For instance, if two kinds of reference signal patterns, such as P1 and P2 are introduced one more information bit may be needed.

EXAMPLE TWO

Figure 4:
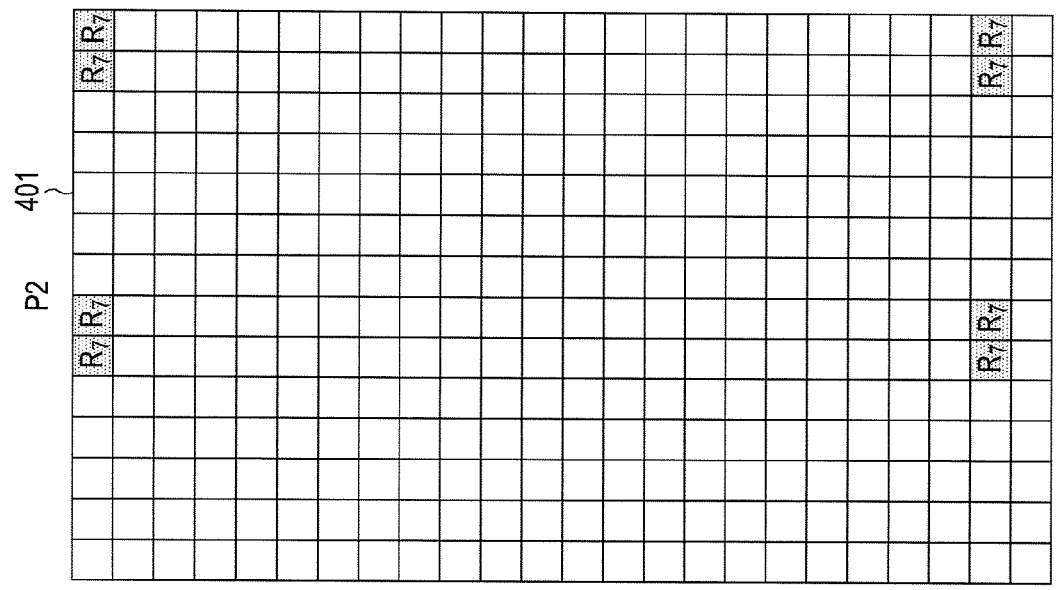
FIG. 4 illustrates two kinds of reference signal patterns which may be dynamically adjusted according to embodiments of this disclosure.
Figure 4:
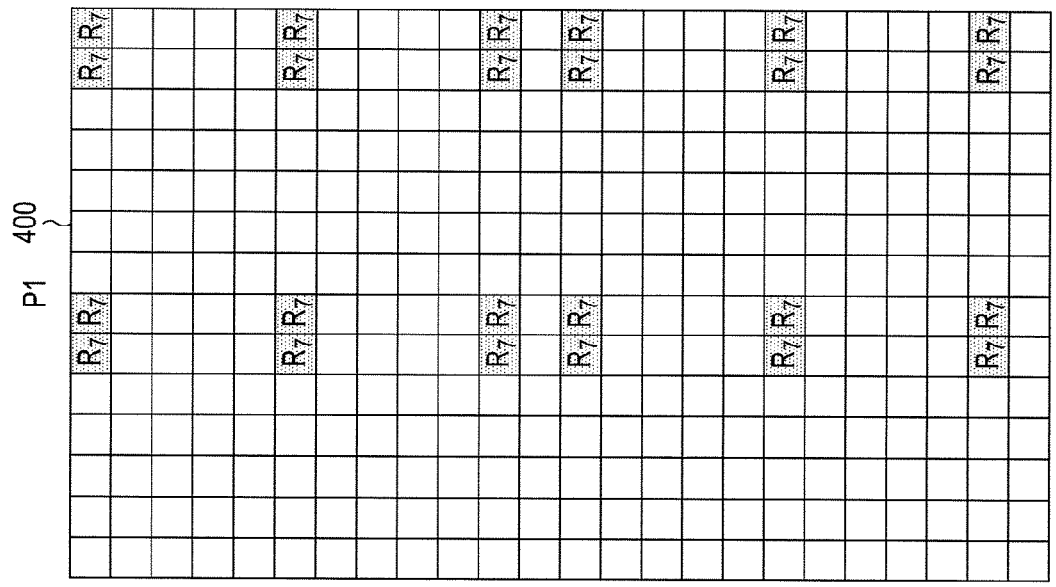
Figure 5:
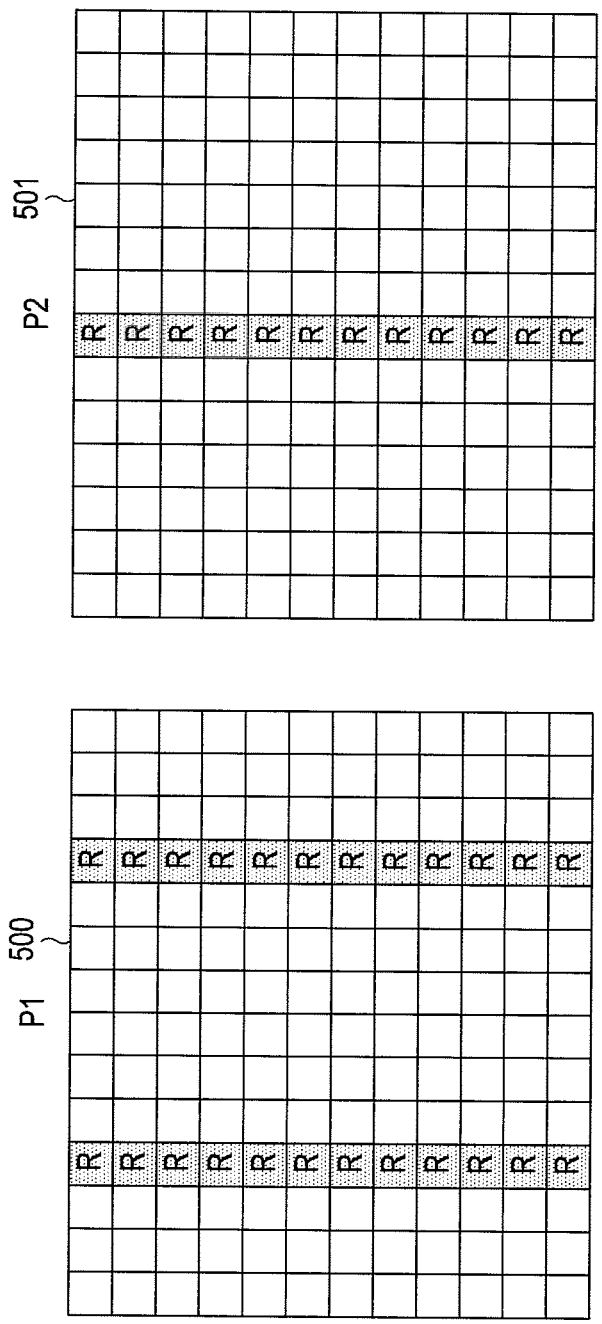
FIG. 5 illustrates another two kinds of reference signal patterns which may be dynamically adjusted according to embodiments of this disclosure.
Figure 6:
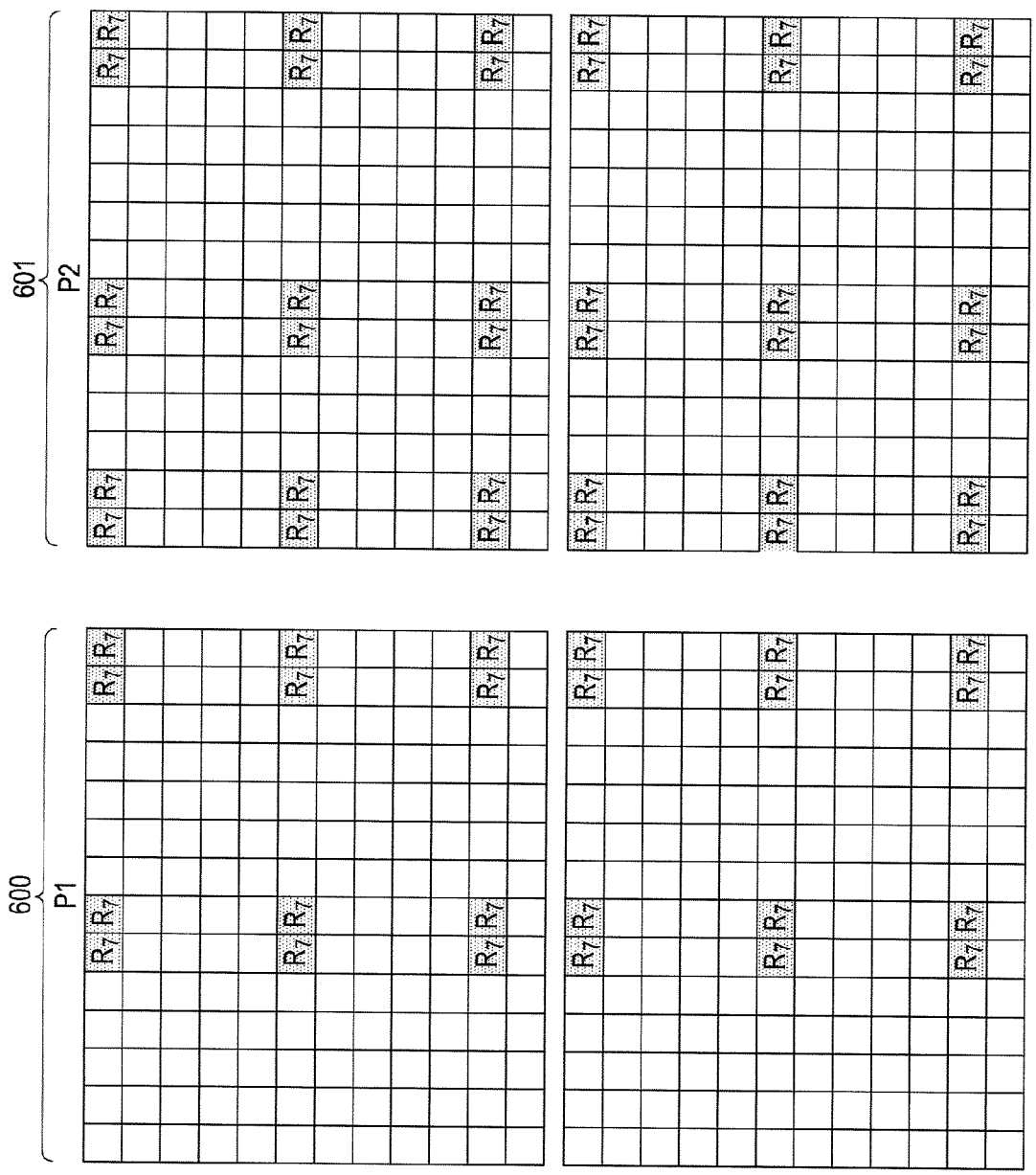
FIG. 6 illustrates two kinds of reference signal patterns which may be dynamically adjusted according to embodiments of this disclosure.

When P1 and P2 are the reference signal patterns shown in FIG. 4, the system may dynamically use two kinds of reference signal patterns 400, 401 with different frequency domain density. How to effectively reduce overhead of the reference signal in the ultra-high-frequency communication by the system may be described hereinafter. In the ultra-high-frequency communication, the channel may have slightly different statistical properties in the LOS transmission and NLOS transmission, which may be particularly reflected in the delay spread of the channel. When the LOS transmission is performed, the delay spread of the channel may be very small and power of reflection path may be less than that of direct path Otherwise, when the NLOS transmission is performed, the delay spread of the channel may be enlarged. Since the density of the reference signal in the frequency domain is applicable to the delay spreading of the channel, the two different kinds of density may be better matched to the LOS and NLOS channel scenarios. When the terminal detects that the transmission channel between the terminal and the eNB is the LOS transmission, the terminal may feed back a MCPS index indicating the P2 according to the measured SINR. Otherwise, the terminal may feed back a MCPS index indicating P1. In a specific implementation process, the above MCPS feedback may be found according to the table shown in table 5.

TABLE 5 combined reference signal and modulation coding scheme selection table in different channel scenarios

| SNR(dB) | NLOS | LOS |
|---|---|---|
| <−5 | 0 | 1 |
| −5~−3 | 2 | 3 |
| −3~0 | 4 | 5 |

TABLE 5-continued combined reference signal and modulation coding scheme selection table in different channel scenarios

| SNR(dB) | NLOS | LOS |
|---|---|---|
| ... | ... | ... |
| 18~20 | 54 | 55 |
| >20 | 56 | 57 |

The design principle of the above reference signal patterns, i.e., P1 and P2 is using different frequency-domain density. Similarly, different time-domain density may be designed for the P1 and P2 to reduce overhead of the reference signal in a low Doppler shift scenario (low speed scenario). For instance, the reference signal pattern P1 500 in FIG. 5 may be the demodulation reference signal of the LTE UL data channel and reference signal pattern P2 501 may be a time-domain low-density reference signal. In the system, the reference signal pattern may be switched to P2 in a scenario, in which the terminal may move slowly, to reduce the overhead of the reference signal. In a specific implementation process, the process for determining the above P1 and P2 may be obtained via detecting the SRS by the eNB or prediction according to local data.

In the ultra-high-speed mobile communication, the reference signal must use larger density to ensure the accuracy of the channel estimation. Therefore, the reference signal pattern (P2 601 in FIG. 6), which may be applicable to the high-speed scenario, may have larger time-domain density than that applicable to a low-speed scenario (P1 600 in FIG. 6). The receiving end may estimate relative speed between the receiving end and the sending end through measuring a received signal such as, measuring the Doppler shift of the received signal. When the receiving end finds that if the relative speed is larger than a threshold, such as 300 km/h, the receiving end may feed back that the sending end may use the reference signal pattern with larger density. Therefore, the selection of the MCPS may be determined according to the measured SINR and the speed and the selection criteria may be found according to the table shown in table 6.

TABLE 6 combined MCPS selection table in scenarios of different speeds

| SNR(dB) | <300 Km/h | >300 Km/h |
|---|---|---|
| <−5 | 0 | 1 |
| −5~−3 | 2 | 3 |
| −3~0 | 4 | 5 |
| ... | ... | ... |
| 18~20 | 26 | 27 |
| >20 | 28 | 29 |

The method in this example may also be applied to high-reliability and ultra-high-order modulation scenario. For the former, when the receiving end measures the low SINR value, the receiving end may obtain better channel estimation effect via the reference signal pattern, which may feed back the P2, to ensure the reliability of the receiving. For the latter, the receiving end may feed back a higher-order modulation scheme and the corresponding high-density reference signal pattern.

It should be noted that in order to simplify the description, two kinds of reference signal patterns are provided in the above examples. The method may be applied to scenarios of multiple reference signal patterns.

Corresponding to the above method, examples of the present disclosure may further provide a corresponding eNB, terminal and system, which may be briefly described hereinafter with the accompanying figures.

Figure 7:
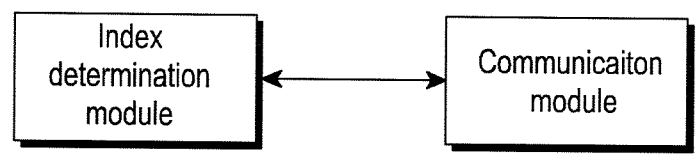
FIG. 7 illustrates a schematic diagram of a structure of an eNB in accordance with embodiments of the present disclosure.

FIG. 7 illustrates a schematic diagram of a structure of an eNB in accordance with embodiments of the present disclosure. The eNB may include: an index determination module and a communication module.

The index determination module may be configured to determine a MCPS index according to channel status information. The MCPS index may be used for indicating a reference signal pattern, a modulation scheme and/or a modulation order and TBS.

The communication module may be configured to perform communication according to the reference signal pattern, modulation scheme and/or modulation order and TBS corresponding to the MCPS index.

Figure 8:
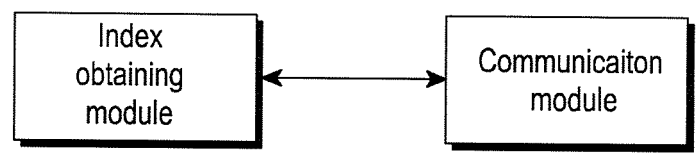
FIG. 8 illustrates a schematic diagram illustrating structure of a terminal in accordance with embodiments of the present disclosure.

FIG. 8 illustrates a schematic diagram of a structure of a terminal in accordance with embodiments of the present disclosure. The terminal may include: an index obtaining module and a communication module.

The index obtaining module may be configured to obtain a MCPS index. The MCPS index may be used for indicating a reference signal pattern, a modulation scheme and/or a modulation order and TBS.

The communication module may be configured to perform communication according to the reference signal pattern, modulation scheme and/or modulation order and TBS indicated by the MCPS index.

An example of the present disclosure provides a system including an eNB and a terminal.

The eNB may be configured to determine a MCPS index according to channel status information and send the MCPS index to the terminal.

The terminal may be configured to determine a reference signal pattern, a modulation scheme and/or a modulation order and TBS according to an indication of the MCPS index.

The eNB and the terminal may be further configured to perform communication according to the reference signal pattern, modulation scheme and/or modulation order and TBS indicated by the MCPS index.

Although the present disclosure has been described with embodiments, various changes and modifications may be suggested to one skilled in the art. It is intended that the present disclosure encompass such changes and modifications as fall within the scope of the appended claims.

What is claimed is:

1. A method for adaptively adjusting a modulation and coding scheme and a reference signal pattern, the method comprising:
    determining a modulation scheme and reference signal pattern scheme (MCPS) index from a MCPS look-up table based on channel status information;
    transmitting at least one reference signal based on a reference signal pattern indicated by the MCPS index; and
    transmitting or receiving a data signal based on the modulation scheme, and a transport block size (TBS) indicated by the MCPS index,
    wherein the MCPS look-up table comprises a plurality of MCPS indexes, each of the plurality of MCPS indexes indicates a combination of a reference signal pattern, a modulation scheme, and a TBS, and
    wherein, from the MCPS look-up table, a same modulation scheme corresponds to at least two different reference signal patterns, and different TBSs correspond to different reference signal patterns.

2. The method of claim 1, wherein:
    the MCPS look-up table configures at least one of the modulation scheme, or the TBS based on a channel estimation performance corresponding to a quantified channel condition and the reference signal pattern to satisfy a minimum requirement limitation of block error rate (BLER), and
    the quantified channel condition comprises a signal to interference and noise ratio (SINR) level.

3. The method of claim 2, wherein:
    the TBS is configured based on a principle of maximum transmission efficiency,
    transmission efficiency is a bit number of valid information transmitted on a minimum resource unit and
    the transmission efficiency (E) is expressed as a product of channel coding rate (R_c) and modulation order (Q_m).

4. The method of claim 1, wherein each reference signal pattern in the MCPS look-up table is based on at least one of a signal density, a reference signal sequence and a reference signal power.

5. The method of claim 1, wherein the channel status information comprises at least one of mobile speed information, a signal to interference and noise ratio (SINR) and delay spread information of a channel.

6. The method of claim 5, wherein the channel status information is obtained via at least one of an explicit feedback method and an implicit obtaining method.

7. The method of claim 6, wherein the explicit feedback method comprises:
    receiving a quantization value of the channel status information; and
    obtaining the channel status information based on the quantization value and a relationship between the quantization value and the channel status information.

8. The method according to claim 6, wherein the implicit obtaining method comprises obtaining the channel status information by measuring a Sounding Reference Signal or positioning information.

9. The method of claim 1, further comprising:
    sending information related to the MCPS index and a scheduled resource to a terminal.

10. An eNB comprising:
    one or more processors configured to determine a modulation and coding and reference signal pattern scheme (MCPS) index from a MCPS look-up table based on channel status information; and
    a transceiver configured to:
        transmit at least one reference signal based on a reference signal pattern indicated by the MCPS index, and
        transmit or receive a data signal based on a modulation scheme and a transport block size(TBS) indicated by the MCPS index,
    wherein the MCPS look-up table comprises a plurality of MCPS indexes, each of the plurality of MCPS indexes indicates a combination of a reference signal pattern, a modulation scheme and a TBS, and
    wherein, from the MCPS look-up table, a same modulation scheme corresponds to at least two different reference signal patterns, and different TBSs correspond to different reference signal patterns.

11. A method for adaptively adjusting a modulation scheme and a reference signal pattern, the method comprising:

obtaining a modulation scheme and reference signal pattern scheme (MCPS) index from a MCPS look-up table based on channel status information;

receiving at least one reference signal based on a reference signal pattern indicated by the MCPS index; and transmitting or receiving a data signal based on the modulation scheme and a transport block size (TBS) indicated by the MCPS index, wherein the MCPS look-up table comprises a plurality of MCPS indexes, each of the plurality of MCPS indexes indicates a combination of a reference signal pattern, a modulation scheme, and a TBS, and wherein, from the MCPS look-up table, a same modulation scheme corresponds to at least two different reference signal patterns, and different TBSs correspond to different reference signal patterns.

12. The method of claim 11, wherein the MCPS look-up table configures at least one of the modulation scheme, or the TBS based on a channel estimation performance corresponding to a quantified channel condition and the reference signal pattern to satisfy a minimum requirement limitation of block error rate (BLER), and wherein the channel condition comprises a signal to interference and noise ratio (SINR) level.

13. The method of claim 12, wherein:

the TBS is configured based on a principle of maximum transmission efficiency, transmission efficiency is a bit number of valid information transmitted on a minimum resource unit and the transmission efficiency (E) is expressed as a product of channel coding rate ($R_{13}$ c) and modulation order (Q_m).

14. The method of claim 11, wherein:

each reference signal pattern in the MCPS is based on at least one of a signal density, a reference signal sequence and a reference signal power.

15. The method of claim 11, further comprising:

detecting the channel status information; and reporting the channel status information, wherein the channel status information comprises at least one of mobile speed information, a signal to interference and noise ratio (SINR), and delay spread information of a channel.

16. The method of claim 15, wherein the reporting comprises quantifying a value of the channel status information, obtaining a quantization value or reporting the quantization value.

17. The method of claim 11, wherein obtaining the MCPS index comprises receiving the MCPS index from an eNB.

18. A terminal comprising:

one or more processors configured to obtain a modulation scheme and reference signal pattern scheme (MCPS) index from a MCPS look-up table based on channel status information; and a transceiver configured to:

receive at least one reference signal based on a reference signal pattern indicated by the MCPS index; and transmit or receive a data signal based on at least one of a modulation scheme and a transport block size (TBS) indicated by the MCPS index, wherein the MCPS look-up table comprises a plurality of MCPS indexes, each of the plurality of MCPS indexes indicates a combination of a reference signal pattern, a modulation scheme, and a TBS, and wherein, from the MCPS look-up table, a same modulation scheme corresponds to at least two different reference signal patterns, and different TBSs correspond to different reference signal patterns.

* * * * *